United States Patent [19]

Koschinat

[11] Patent Number: 4,890,939
[45] Date of Patent: Jan. 2, 1990

[54] DEVICE FOR MOUNTING THE CAM SHAFT FOR ACTUATING THE BRAKE SHOES OF A DRUM BRAKE FOR VEHICLES AND THE LIKE

[75] Inventor: B. Hubert Koschinat, Hösbach-Winzenhohl, Fed. Rep. of Germany

[73] Assignee: Otto Sauer Achsenfabrik Keilberg, Bessenbach-Keilberg, Fed. Rep. of Germany

[21] Appl. No.: 242,418

[22] Filed: Sep. 9, 1988

[30] Foreign Application Priority Data

Sep. 9, 1987 [DE] Fed. Rep. of Germany ....... 3730191

[51] Int. Cl.⁴ .............................................. F16C 33/10
[52] U.S. Cl. ..................................... 384/322; 188/239; 384/276
[58] Field of Search ............... 384/276, 322, 397, 398, 384/400, 297, 151, 153; 188/239

[56] References Cited

U.S. PATENT DOCUMENTS

| | | | |
|---|---|---|---|
| 2,719,065 | 9/1955 | Hornbostel | 384/398 |
| 4,494,290 | 1/1985 | Rutledge | 188/239 X |
| 4,576,488 | 3/1986 | Steiner et al. | 384/322 X |
| 4,701,061 | 10/1987 | Stubbersfield | 384/569 X |

FOREIGN PATENT DOCUMENTS

| | | | |
|---|---|---|---|
| 2497891 | 7/1982 | France | 384/397 |
| 169363 | 11/1959 | Sweden | 384/322 |

Primary Examiner—Thomas R. Hannon
Attorney, Agent, or Firm—Wenderoth, Lind & Ponack

[57] ABSTRACT

A device for mounting a cam shaft for actuating the brake shoes of a drum brake for vehicles and the like, in which the cam shaft is mounted in a bearing eye of the brake bracket via a bearing section by a bushing, includes a tigthening disk and a guard ring for restraining axial movement of the cam shaft. There is a bearing section in the brake bracket for rotatably supporting the cam shaft on a section adjacent to the S-shaped cam. And, to avoid too much grease on the brakes and to increase the low maintenance or allow for no maintenance of the device, the bearing eye has an extension on the other side of the cam away from the cam and beyond the bearing section to define a grease chamber enclosing the cam shaft.

16 Claims, 2 Drawing Sheets

DEVICE FOR MOUNTING THE CAM SHAFT FOR ACTUATING THE BRAKE SHOES OF A DRUM BRAKE FOR VEHICLES AND THE LIKE

BACKGROUND OF THE INVENTION

1. Field of the Invention

The invention relates to a device for mounting a cam shaft to actuate brake shoes of a drum brake for vehicles and the like, in which the cam shaft is mounted in a bearing eye of the brake bracket by means of a bushing via a bearing section and is secured immovably axially, for example, by means of a tightening disk and by guard rings, and bears, adjacent to the bearing section, e.g. an S-shaped cam which serves to actuate the brake shoes.

2. Description of the Prior Art

In such known bearing devices in which usually the end of the bearing eye does not completely project out of the brake or its cover plates, there exists the problem of supergreasing and thus having a negative impact on the braking action, if excess grease gets on the active surfaces of the brake shoes and/or the brake drum. The problem exists in particular during central chassis lubrication, since relatively thin oil or grease is used. Furthermore, the conventional cam shaft bearings have to be frequently regreased.

SUMMARY

Starting from this point, the object of the present invention is to provide a cam shaft bearing of the aforementioned kind in which too much grease on the brake is avoided with certainty and in which advantageously the goal of low-maintenance or no maintenance can be achieved.

This problem is solved by means of the invention essentially in that the bearing eye on the other side of the cam beyond the bearing section has an extension in order to form the first grease chamber enclosing the cam shaft. Excess grease can exit the bearing section into the grease chamber without getting too much grease on the brake, because the end of the extension is outside the brake and/or outside the cover plate so that the grease cannot get on the brake.

Thus not only initially but also upon re-greasing, the cam shaft bearing of the invention can be provided with an excess of grease or oil so that the frequency of maintenance can be reduced without risking an adverse effect on the brake action.

To distribute the lubricant the bushing can have on its outside, adjacent to the inside of the bearing eye, and/or the bearing eye can have on its inside, adjacent to the bushing, at least one circular groove.

Preferably the circular groove is connected to a grease admission hole, which assures the feed of grease into the bearing gap between the bushing and the cam shaft.

Furthermore, the grease supply channel empties into the respective groove to facilitate re-greasing.

However, the bushing can also, or instead, be designed as a self-lubricating, e.g. oil-saturated plastic bushing, in order to reduce still further the necessity of maintenance.

Preferably the bushing should have dry-running properties so that even with deferred maintenance the brake remains fully functional.

Thus it is especially advantageous if the bushing is designed as a two component bushing, with an inner, e.g. graphite-containing sliding layer and an outer, e.g. metal bearing layer, whereby in particular steel or brass is a suitable metal.

Furthermore, the bearing gap between the bearing eye and the cam shaft is preferably sealed, at least on the cam side, e.g. by means of a compared to the conventional o-rings, have a relatively long course in the radial direction.

According to another feature of the invention, the tightening disk with the guard ring, in order to mount the cam shaft axially in the bearing eye, engages at the outer end of the extension of the bearing eye. Thus the first grease chamber, enclosed by the extension of the bearing eye, is outwardly bound in order to make it difficult for the grease to exit.

However, it is also possible to seal the open end of the first grease chamber, for example, by means of the radial shaft sealing ring so that almost no grease escapes and thus the need for maintenance can be reduced even further.

According to another concept of the invention, the open end of the first grease chamber, if desired including the tightening disk with the guard ring, is overlapped by a bellows-like sealing sleeve, forming a second grease chamber. The sealing sleeve can fit into a groove, running around the outside of the extension of the bearing eye, by means of a retaining collar and abut the cam shaft with a bellows-like section to form a seal. In particular rubber or plastic are suitable materials for the sealing sleeve. A cam shaft bearing that is equipped thus is practically maintenance free. Due to the large volume that is available for a supply of grease, regreasing is practically no longer mandatory. The sealing sleeve prevents the penetration of dirt, water or steam when the vehicle is being driven or cleaned.

To fill the entire bearing, including the grease chamber, during the initial lubrication, a sealable lubricating hole empties directly into this chamber.

Another feature of the invention is that the diameter of the section of the cam shaft inside the first grease chamber is negligibly smaller than the diameter of the bearing section of the cam shaft. Thus with not only this kind of cam shaft bearing of the invention but also with other cam shaft bearings it is possible to readily dismount the cam shaft from the bearing eye despite rusting outside the bearing section, which must be done toward the side where the cam is.

In another embodiment of the inventive thought, the diameter of the section of the cam shaft, which connected to the extension of the bearing eye is outside the first grease chamber, is negligibly smaller than the diameter of the section of the cam shaft inside the first grease chamber. thus the circumstance is taken into account that when painting the vehicle, frequently the section of the cam shaft, projecting out of the first grease chamber, is also painted, which—with the conventional uniform diameter—has a negative effect on the dismountability of the cam shaft. This negative factor is alleviated by the latter feature of the invention.

The aforementioned explanations yield the fact that the reduction in the diameter of the cam shaft within the first grease chamber should be in an order of magnitude equal to the amount of rust to be expected; and the subsequent reduction in the diameter outside the first grease chamber, as compared to the diameter in the bearing section, should be in an order of magnitude equal to the layer of paint to be expected.

Other goals, features, advantages and application possibilities of the present invention result from the following description of the embodiments with the aid of the drawing. All described and/or illustrated features by themselves or in any other desired logical combination form the object of the present invention, also independently of their summary in the claims or their references.

Figure 1:
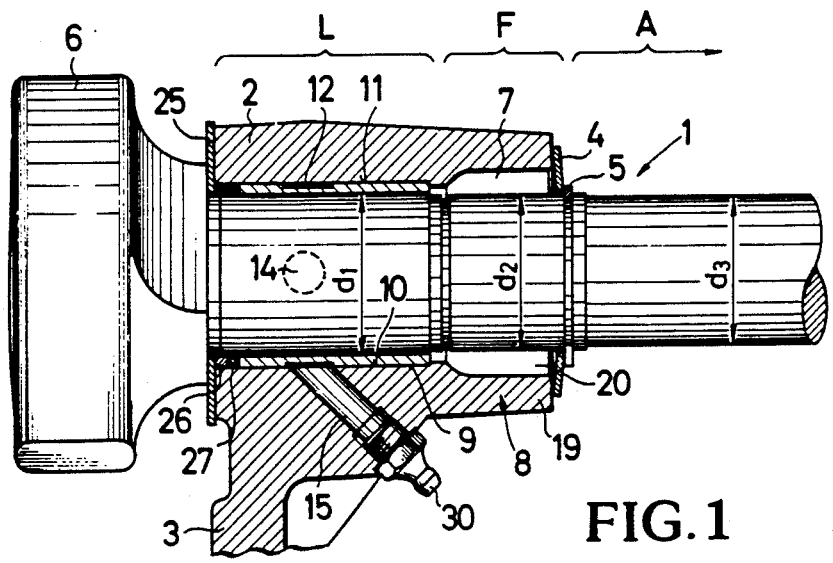
FIG. 1 is a side view, in part fragmentary, of a cam shaft bearing of the invention in accordance with a first embodiment.

According to FIG. 1, a cam shaft 1 for actuating the brake shoes of a drum brake for vehicles and the like is held in position over a bearing section L by means of a bushing 9 in a bearing eye 2 of the (partially deleted) brake bracket 3. At the same time the cam shaft 1 is held axially immovable at a disk 25 adjacent to the S-shaped cam 6 by means of a tightening disk 4, which engages at the outer end 19 of an extension 8 of the bearing eye 2 and interacts with a guard ring 5. A spacing ring 26 and an O-ring 27 are in the bearing gap between disk 25 and bushing 9. The extension 8 of the bearing eye 2, which is on the other side from the cam 6, over the bearing section L forms the first grease chamber 7, enclosing the cam shaft, due to the distance of the extension from the cam shaft 1. There is on the outside 11 of the bushing 9 a groove 12 to whose outside the inside 10 of the bearing eye 2 is adjacent. The groove 12 can receive a supply of grease, which for example can be filled with lubricant via a grease nipple 30 and a grease supply channel 15 at the time of the initial greasing or subsequent grease jobs. The lubricant is transferred to the surface of the bearing section L of the cam shaft 1 via a grease admission hole 14. As the figure shows, excess grease exiting from the bearing gap can be received by the grease chamber 7, which at its open end 20 is bound by the tightening disk 4 with the guard ring 5. The extension 8 is drawn outwardly so far that any grease exiting from the first grease chamber 7 cannot get to the brake and cannot have a negative effect on the braking action. The bushing 9 can also, or instead, be designed as a self-lubricating, e.g. oil-saturated plastic bushing and in particular have dry-running properties. Furthermore, the first grease chamber 7, which is bound by the tightening disk 4, can be effectively sealed by means of a (not shown) radial shaft sealing ring. As one can also recognize from the drawing, the diameter $d_2$ of the section F inside the first grease chamber 7 is negligibly smaller than the diameter $d_1$ of the bearing section L of the cam shaft 1. This assures that even if the surface of the cam shaft rusts outside the bearing section L, the cam shaft 1 can be readily dismounted from the bearing eye 2 (toward the left in the drawing). The drawing also shows that the diameter $d_3$ of the section A of cam shaft 1, which in connection with the extension 8 of the bearing eye 2 is outside the first grease chamber 7, is negligibly smaller than the diameter $d_2$ of the section F of the cam shaft 1, which is within the first chamber 7. Thus the possibility is taken into account that the section A of the cam shaft 1 is also painted under circumstances when the vehicle is painted. Reducing the diameter $d_3$ assures that even then the cam shaft 1 can be readily dismounted from the bearing eye 2 (towards the left in the drawing).

Figure 2:
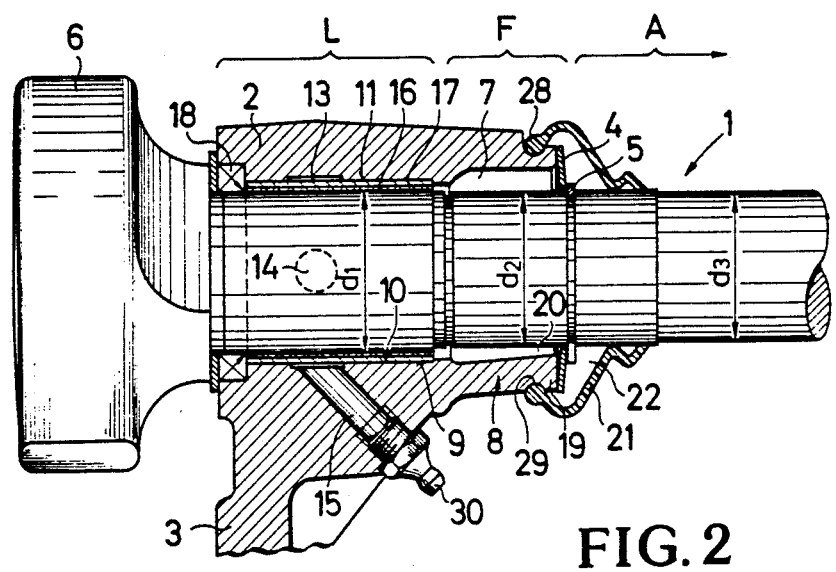
FIG. 2 is a side view of another cam shaft bearing of the invention.

The second embodiment of the cam shaft bearing of the invention, according to FIG. 2, is similar to that of FIG. 1; the only differences are a few features, which will be mentioned here in detail. First, the bearing gap between cam shaft 1 and bearing eye 2 is sealed on the cam side with a radial shaft sealing ring 18, which, as compared to conventional o-rings, has a relatively long course in the radial direction. The bearing bushing 9 itself is designed as a two component bushing, and in particular with an inner, e.g. graphite-containing sliding layer 16 and an outer, e.g. metal bearing laying 17. In this case for a simpler constructability of the bushing 9, which is equipped with the same wall thickness, the groove 13 lies in the inner surface 10 of the bearing eye 2. The open end 20 of the first grease chamber 7 is bound not only by the tightening disk 4 with guard ring 5 but is also overlapped by a bellows-like sealing sleeve 21, forming a second grease chamber 22 in which grease can enter from the inside but no dirt, vapor or water can enter from the outside. The sealing sleeve 21 is secured in position by means of a ring-shaped retaining collar 28, which fits in a groove 29 at the outer end 19 of the extension 8. Even with this embodiment it is possible to re-grease for example via the grease nipple 30 and the grease supply channel 15, whereby both the first grease chamber 7 and the second grease chamber 22 can receive excess lubricant. Therefore, this embodiment of the invention requires even less maintenance than that in FIG. 1.

Figure 3:
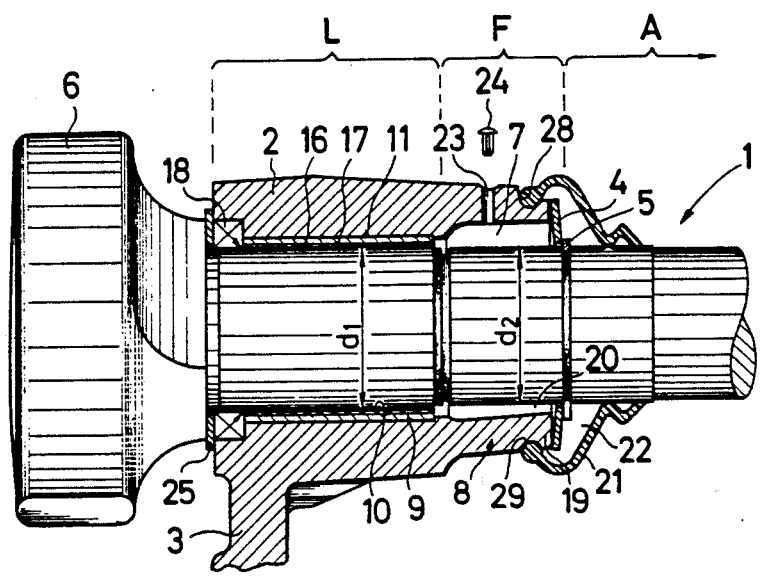
FIG. 3 is again a side view of a third embodiment of a cam shaft bearing according to the invention.

FIG. 3 shows the third embodiment of the invention which is an almost maintenance-free cam shaft bearing. therefore, in this case, too, as compared to the embodiment of FIG. 2, no grease nipple 30, no grease supply channel 15 and no groove 13 in the inside 10 of the bearing eye 2 is shown, since a re-greasing at this point is unnecessary. Instead, a lubricant hole 23, which serves to fill the first grease chamber 7 and the second grease chamber 23 upon initial lubrication and is then closed by means of a plug 24, empties directly into the first grease chamber 7. Such a supply of lubricant lasts almost the entire life of the cam shaft bearing. it has to be renewed only upon wear, for example, of the two component bushing 9 and/or the sealing sleeve 21 and/or the radial shaft sealing ring 18. Here, too, instead of the sealing sleeve 21, a (not illustrated) radial shaft sealing ring is possible; similarly, the combination of other features of the embodiments, illustrated in FIGS. 1 and 2, can be taken into consideration.

List of reference numbers:

1 cam shaft
2 bearing eye
3 brake bracket
4 tightening disk
5 guard ring
6 cam
7 first grease chamber
8 extension
9 bushing
10 inside surface
11 outside surface
12 groove
13 groove
14 grease admission hole
15 grease supply channel
16 sliding layer 17 bearing layer
18 radial shaft sealing ring
19 outer end
20 open end
21 sealing sleeve
22 second grease chamber
23 lubricant hole
24 plug
25 disk
26 spacing ring
27 o ring
28 retaining collar
29 groove
30 grease nipple
L bearing section
F section
A section

I claim:

1. In combination, a bearing means for rotatably mounting a cam shaft for actuating brake shoes of a vehicle drum brake, and a cam shaft having an S-shaped cam, said combination comprising:
   a bearing means for rotatably supporting said cam shaft, said bearing means including a brake bracket having a bearing eye defined thereon, a bearing section defined in said bearing eye, a bushing received in said bearing section for rotatably receiving a section of said cam shaft thereon, an extension on said bearing eye for jointly defining a first grease chamber with a tightening disk, said first grease chamber being adjacent to said bearing section and around a part of said cam shaft, and said first grease chamber being on a side of said brake bracket other than the side adjacent which said S-shaped cam of said cam shaft is received;
   a cam shaft having an S-shaped cam for actuating brake shoes of a vehicle, and said cam shaft being received in said bearing eye and rotatably supported on said bushing in said bearing section;
   a tightening disk adjacent to said extension on said bearing eye; and
   a guard disk mounted on said cam shaft and retaining said tightening disk adjacent to said extension of said bearing eye, and said guard disk and said tightening disk jointly axially restraining said cam shaft.

2. A device as in claim 1, wherein at least one circular groove is defined in at least one of an outer surface of said bushing and an inner surface of said bearing eye of said brake bracket.

3. A device as in claim 2, wherein a grease admission hole is defined in said brake bracket, and said at least one circular groove is fluidly communicated with said grease admission hole.

4. A device as in claim 1, wherein said bushing has self-lubricating means.

5. A device as in claim 4, wherein said self-lubricating means of said bushing is an oil-saturated plastic material.

6. A device as in claim 1, wherein said bushing has means for dry-running.

7. A device as in claim 1, wherein said bushing is a two component bushing having an inner layer and an outer layer, said inner layer being a graphite-containing sliding layer, and said outer layer being a metal-bearing layer.

8. A device as in claim 1, wherein a radial shaft sealing ring is attached to the side of said brake bracket adjacent to said S-shaped cam of said cam shaft for sealing a bearing gap between said bearing eye and said cam shaft.

9. A device as in claim 1, wherein said extension of said bearing eye has a free outer end, and said tightening disk has means for engaging said free outer end when said guard ring retains said tightening disk adjacent to said extension.

10. A device as in claim 1, wherein a radial shaft sealing ring further seals said first grease chamber.

11. A device as in claim 1, wherein a bellows-like sealing sleeve is attached to said extension, surrounds said tightening disk and said guard ring, and defines a second grease chamber.

12. A device as in claim 1, wherein a closable grease hole is defined in said brake bracket and fluidly communicates with said first grease chamber.

13. A device as in claim 1, wherein the diameter of the cam shaft in said first grease chamber is smaller than the diameter of said cam shaft received on said bearing in said bearing section.

14. A device as in claim 3, wherein the diameter of said cam shaft other than the parts of said cam shaft received in said first grease chamber and on said bearing is smaller than the diameter of said cam shaft received in said first grease chamber.

15. A bearing device for rotatably mounting a cam shaft for actuating brake shoes of a vehicle drum brake, said bearing device comprising:
   a bearing means for rotatably supporting a cam shaft, said bearing means including a brake bracket having a bearing eye defined thereon, a bearing section defined in said bearing eye, a bushing received in said bearing section for rotatably receiving a section of a cam shaft thereon, an extension on said bearing eye for jointly defining a first grease chamber with a tightening disk, and said first grease chamber being adjacent to said bearing section and around a part of a cam shaft received therein;
   a tightening disk adjacent to said extension on said bearing eye; and
   a guard disk having means for mounting on a cam shaft and for retaining said tightening disk adjacent to said extension of said bearing eye, and said guard disk and said tightening disk jointly axially restraining a cam shaft rotatably received by said bearing means.

16. A device as in claim 15, wherein a bellows-like sealing sleeve is attached to said extension, surrounds said tightening disk and said guard ring, and defines a second grease chamber.

* * * * *